United States Patent [19]

Chao

[11] Patent Number: 5,682,222
[45] Date of Patent: Oct. 28, 1997

[54] SPECTACLE FRAME HAVING MAGNETIC COUPLING

[76] Inventor: Richard Chao, No. 43-4, Yi Hsin Tsuen, Shui San Hsiang, Chia Yi Hsien, Taiwan

[21] Appl. No.: 574,179

[22] Filed: Dec. 18, 1995

[51] Int. Cl.⁶ .................................. G02C 5/14; G02C 5/00
[52] U.S. Cl. ............................ 351/111; 351/41; 351/140
[58] Field of Search ........................... 351/111, 41, 116, 351/140, 153, 158, 51, 52

[56] References Cited

U.S. PATENT DOCUMENTS

| | | | |
|---|---|---|---|
| 3,064,530 | 11/1962 | Vigano | 351/121 |
| 3,422,449 | 1/1969 | Rinnman | 351/140 |
| 3,574,452 | 4/1971 | McLendon et al. | 351/153 |
| 3,582,192 | 6/1971 | Gitlin et al. | 351/52 |
| 3,907,410 | 9/1975 | Richmond et al. | 351/119 |
| 4,456,346 | 6/1984 | Beyer | 351/113 |
| 5,321,442 | 6/1994 | Albanese | 351/41 |
| 5,416,537 | 5/1995 | Sadler | 351/47 |

*Primary Examiner*—Hung X. Dang
*Attorney, Agent, or Firm*—Peterson, Wicks, Nemer & Kamrath, P.A.

[57] ABSTRACT

A spectacle frame includes two extensions extended from the side portions and each having a magnetic member. A pair of legs are pivotally coupled to the extensions and each has another magnetic member secured in one end for engaging with the magnetic members of the frame so as to rotate the legs to a position parallel to the extensions and perpendicular to the frame by an attraction force between the magnetic members. The legs will not apply a spring force but may apply a gentle force against the users such that the users may feel more comfortable when wearing the spectacle frame.

3 Claims, 1 Drawing Sheet

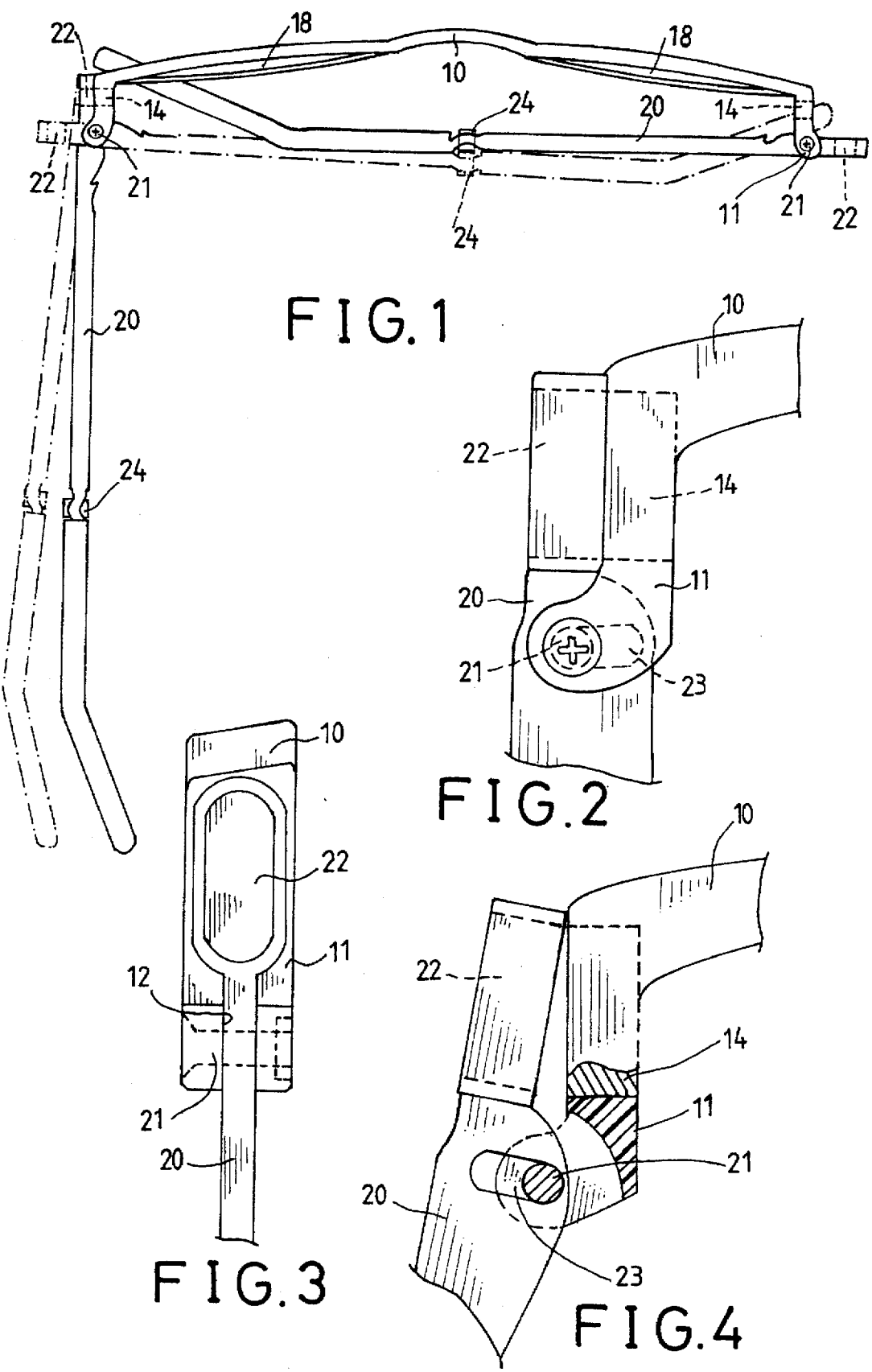

SPECTACLE FRAME HAVING MAGNETIC COUPLING

BACKGROUND OF THE INVENTION

1. Field of the Invention

The present invention relates to a spectacle frame, and more particularly to a spectacle frame having magnetic members for attracting the legs to the frame body.

2. Description of the Prior Art

Typical spectacle frames comprise a spring action hinge for resiliently coupling the legs to the frame body. Two of the prior arts are disclosed in U.S. Pat. Nos. 4,747,183 to Drlik and 5,018,242 to Guy et al. In both of the prior arts, the spring action hinges may apply a resilient force to the legs, which, in turn, may apply a resilient force against the users such that the users may not feel comfortable. In addition, it will be difficult to engage so many parts or elements within the frame body and within the legs which include a small size normally.

The present invention has arisen to mitigate and/or obviate the afore-described disadvantages of the conventional spectacle frames.

SUMMARY OF THE INVENTION

The primary objective of the present invention is to provide a spectacle frame which includes a pair of legs that will not apply a spring force against the users and that may apply a gentle force against the users so as to allow the users to feel more comfortable when wearing the spectacle frame.

In accordance with one aspect of the invention, there is provided a spectacle frame comprising a frame body for supporting lenses therein, the frame body including two side portions each having an extension extended therefrom, the extensions each including a first magnetic member secured therein, and a pair of legs each including an end portion pivotally coupled to the extensions at a pivot pin so as to allow the legs to be rotated about the pivot pins respectively, the legs each including a first end having a second magnetic member secured therein for engaging with the first magnetic members so as to attract and to rotate the legs to a position substantially in parallel to the extensions and perpendicular to the frame body by an attraction force between the first and the second magnetic members.

The extensions each includes a groove formed therein for engaging with the end portions of the legs, the end portions of the legs each includes an oblong hole formed therein, the pivot pins are secured in the extensions and engaged in the oblong holes respectively for allowing the pivot pins to move along the oblong holes respectively.

The legs each includes a middle portion having a third magnetic member secured therein, the third magnetic members are attracted toward each other so as to maintain the legs in a superposed position when the legs are rotated to a position in parallel to the frame body.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a top plane view of a spectacle frame in accordance with the present invention;

FIG. 2 is an enlarged partial top view illustrating the coupling of the leg to the spectacle frame;

FIG. 3 is a side view of FIG. 2; and

FIG. 4 is a schematic view similar to FIG. 2, in which a portion of the member is cut off, illustrating the operation of the spectacle frame.

DETAILED DESCRIPTION OF THE PREFERRED EMBODIMENT

Referring to the drawings, and initially to FIGS. 1 to 3, a spectacle frame in accordance with the present invention comprises a frame body 10 for supporting lenses 18 therein. The frame body 10 includes two side portions each having an extension 11 extended rearward therefrom. The extensions 11 each includes a free end having a groove 12 (FIG. 3) formed therein and each includes a magnetic member 14 secured therein. A pair of legs 20 each includes an end portion pivotally coupled to the respective extensions 11 at a pivot pin 21 such that the legs 20 may be rotated about the pivot pins 21 respectively. The pivot pins 21 are extended through the respective grooves 12. The legs 20 each includes one end having a magnetic member 22 secured therein for engaging with the magnetic members 14 of the extensions 11 such that the legs 20 may be attracted and rotated to a position substantially parallel to the extensions 11 or perpendicular to the frame body 10 by the attraction force of the magnetic members 14, 22.

As shown in FIG. 2, the end portions of the legs 20 each includes an oblong hole 23 formed therein for engaging with the pivot pin 21 which may be moved along the respective oblong holes 23. As best shown in FIG. 4, the legs 20 may be rotated about the end portions thereof so as to move the oblong hole 23 relative to the pivot pin 21 such that the legs 20 may be rotated outward or moved away from each other and such that the spectacle frame may be easily engaged onto the user's face. The magnetic members 14, 22 may be attracted toward each other so as to move the legs 20 to the position substantially perpendicular to the frame body 10.

It is to be noted that no spring force is applied to the legs such that no spring force will be applied to the users. The legs may apply a gentle force against the users such that the users may feel comfortable. The magnetic members may be easily engaged in the legs and in the extensions such that the spectacle frames may be easily manufactured.

As shown in FIG. 1, the middle portions of the legs 20 each includes another magnetic member 24 therein for attracting each other so as to maintain the legs 20 in a position in parallel to each other.

Accordingly, the eyeglass device in accordance with the present invention includes a pair of legs that will not apply a spring force against the users and that may apply a gentle force against the users so as to allow the users to feel more comfortable when wearing the spectacle frame.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A spectacle frame comprising:

a frame body for supporting lenses therein, said frame body including two side portions each having an extension extended therefrom, said extensions each including a first magnetic member secured therein, and a pair of legs each including an end portion pivotally coupled to said extensions at a pivot pin so as to allow said legs to be rotated about said pivot pins respectively, said legs each including a first end having a second magnetic member secured therein for engaging with said first magnetic members so as to attract and to rotate said legs to a position substantially in parallel to said extensions and perpendicular to said frame body by an attraction force between said first and said second magnetic members.

2. A spectacle frame according to claim 1, wherein said extensions each includes a groove formed therein for engaging with said end portions of said legs, said end portions of said legs each includes an oblong hole formed therein, said pivot pins are secured in said extensions and engaged in said oblong holes respectively for allowing said pivot pins to move along said oblong holes respectively.

3. A spectacle frame according to claim 1, wherein said legs each includes a middle portion having a third magnetic member secured therein, said third magnetic members are attracted toward each other so as to maintain said legs in a superposed position when said legs are rotated to a position in parallel to said frame body.

* * * * *